(12) United States Patent
Yue

(10) Patent No.: US 10,148,841 B2
(45) Date of Patent: *Dec. 4, 2018

(54) SCAN BOUNDARY INDICATORS

(71) Applicant: KYOCERA Document Solutions Inc., Osaka (JP)

(72) Inventor: Tommy Yue, Daly City, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/714,759

(22) Filed: Sep. 25, 2017

(65) Prior Publication Data
US 2018/0097962 A1 Apr. 5, 2018

Related U.S. Application Data

(63) Continuation of application No. 14/970,432, filed on Dec. 15, 2015, now Pat. No. 9,774,754.

(51) Int. Cl.
H04N 1/04 (2006.01)
H04N 1/10 (2006.01)
H04N 1/028 (2006.01)
H04N 1/00 (2006.01)

(52) U.S. Cl.
CPC ........... *H04N 1/10* (2013.01); *H04N 1/00734* (2013.01); *H04N 1/00748* (2013.01); *H04N 1/00755* (2013.01); *H04N 1/0282* (2013.01)

(58) Field of Classification Search
CPC .... H04N 1/10; H04N 1/0282; H04N 1/00734; H04N 1/00748; H04N 1/00755
USPC ......................................... 358/488, 497, 475
See application file for complete search history.

(56) References Cited

U.S. PATENT DOCUMENTS

| | | | |
|---|---|---|---|
| 6,621,597 B1* | 9/2003 | Kuwahara | H04N 1/0035 358/448 |
| 7,221,487 B2* | 5/2007 | Sesek | H01L 27/146 257/E27.13 |
| 9,774,754 B2* | 9/2017 | Yue | H04N 1/0282 |
| 2018/0097952 A1* | 4/2018 | Yue | H04N 1/00551 |

FOREIGN PATENT DOCUMENTS

JP 2001197267 A * 7/2001

* cited by examiner

*Primary Examiner* — Cheukfan Lee
(74) *Attorney, Agent, or Firm* — West & Associates, A PC; Stuart West

(57) ABSTRACT

A scanner comprising a platen, a first laser assembly movable along a first axis, a second laser assembly movable along a second axis substantially orthogonal to the first axis, and laser movement controllers configured to control the movement of the laser assemblies along their axes. The laser assemblies comprise laser emitters configured to project laser lines on the platen that illustrate edges the current scan area, such that the dimensions and/or position of the scan area can be adjusted by moving the laser lines on the platen.

11 Claims, 11 Drawing Sheets

SCAN BOUNDARY INDICATORS

CLAIM OF PRIORITY

This Application is a continuation of U.S. Non-Provisional application Ser. No. 14/970,432, now U.S. Pat. No. 9,774,754, filed Dec. 15, 2015, which is incorporated herein by reference.

BACKGROUND

Field of the Invention

The present disclosure relates to document scanners, particularly a flatbed scanner having laser lines projected onto a platen that define a scan area.

Background

Document scanners are commonly used to create digital representations of physical documents that can be digitally stored, transmitted, and/or edited. For example, many offices have been moving toward a "paperless" environment in which digital documents are preferred. Hard copies of paper documents are often scanned so that they can be transmitted via email or other means, stored on servers or hard disks, or edited with computer programs. Users working with photographs or other image-based documents can also desire to scan them in order to work with them digitally.

One type of document scanner is a flatbed scanner that has a platen, a window of glass or other transparent material, upon which documents can be placed. An image sensor in the flatbed scanner can be configured to move underneath the platen to scan documents resting on the platen. Flatbed scanners can be either standalone pieces of equipment, or be incorporated into larger devices. For example, a multifunctional printer (MFP) can include a printer, scanner, copier, fax machine, and/or other components in a single device.

Many flatbed scanners include a platen that is larger than the 8.5 by 11 inch dimensions of a standard US Letter-sized sheet of paper, such that the scanner can scan more than one page side by side on the platen, and/or scan documents in a variety of different sizes. However, many scanners are set by default to scan a specific section of the platen, such as an area with the dimensions of a single 8.5 by 11 inch US Letter-sized sheet of paper. Users who desire to scan a document of a different size may need to change the scan area from the scanner's default, either through setting on the scanner itself or through software on a computer or other connected device.

Although the scan area can be configurable, many users may not be sure of the exact dimensions of the document they want to scan, and thus be unsure of what dimensions to select for the scan area. In other cases, users may become frustrated when the edges of a scanned document are cut off because the wrong scan size was selected, or when users do not realize they should have changed the scan area from the default size.

Similarly, users who want to scan a non-rectangular document may not be sure which scan size to select in the scanner's settings to scan the full non-rectangular document. For example, a parent that wants to scan a child's artwork that has been cut out in the shape of a cartoon character's silhouette can be unsure of what size and shape scan area to select in order to fully scan the irregular shape of the artwork.

Even users that are scanning a standard sized document can be unclear on exactly where to place it on a larger platen. For example, the scan area is often set in a corner of the platen by default, but users may not be sure which corner is the correct one in which to place their document for scanning.

Some scanners solve these problems by performing a preliminary scan of the full platen as a preview, and displaying the results of the preliminary scan to a user as a preview image on a display, either on the scanner or on a computer or other connected device. The user can then click and drag a box around the preview image to select a specific scan area, or otherwise select a specific scan area they want within the larger area scanned during the preview scan. The scanner can then perform a full scan within the smaller area that was selected. However, this method can be slow and inefficient since it requires two scans and user interaction.

Some scanners attempt image recognition in order to find portions of the preview image that the user is likely to want to scan, and thereby automatically select a final scan area from a preview scan. However, such methods can still result in the incorrect scan area being selected. By way of a non-limiting example, portions of the platen covered by a piece of paper can have a different color or contrast than uncovered portions in the preliminary scan, and the scanner can set the scan area to an area that appears to have been covered by the paper in the preliminary scan. However, this automatically selected area may not be the actual area that a user wants to scan, or it may be sized to an area of high-contrast text while ignoring blank space on a page that a user still wants to scan. In this situations, user interaction is still required to confirm or modify the dimensions of the scan area before a final scan is performed, and two scans are still required.

While some documents scanners use a preliminary scan as described above to confirm the desired scan area, scanning documents on a MFP is often done directly at the MFP alone without the use of a connected computer or other device that can display the results of a preview scan. Instead, the specific dimensions of the desired scan area are typically selected at the MFP prior to the scan, and the resulting digital representation is immediately stored on a server or other memory device for later use, or transmitted directly to another device or location. In these cases, no opportunity exists for a user to review the results of a preliminary scan before a final scan takes place.

Another solution to the problem of where to place documents on the platen, and what scan area to select, has been to mark various scan areas directly on the platen with lines. For example, translucent lines defining the boundaries of scan areas can be marked on the platen in a color that will be ignored by the image sensor, so that the lines appear invisible in the final scan. However, such lines can become discolored over time, such that they are no longer invisible to the image sensor and lines appear in the scanned image.

What is needed is a document scanner with laser line indicators projected onto the platen that mark the boundaries of the current scan area. The laser line indicators should also be movable to allow user to visibly change the dimensions of the scan area prior to scanning.

SUMMARY

The present disclosure provides a scanner comprising a platen, a first laser assembly mounted below the platen that is movable along a first axis, a second laser assembly mounted below the platen that is movable along a second axis substantially orthogonal to the first axis, and laser movement controls configured to control movement of the laser assemblies along their axes. Each laser assembly can project a laser line onto the platen that illustrates the dimensions and/or position of a scan area on the platen. The laser movement controls can be operated to adjust the dimensions and/or position of the scan area on the platen.

The present disclosure also provides a scanner comprising a platen, a first x-axis laser assembly mounted below the platen that is movable along a first axis, a second x-axis laser assembly mounted below the platen that is movable along the first axis, a first y-axis laser assembly mounted below the platen that is movable along a second axis substantially orthogonal to the first axis, a second y-axis laser assembly mounted below the platen that is movable along the second axis, and laser movement controls configured to control movement of the laser assemblies along their axes. Each laser assembly can project a laser line onto the platen that illustrates the dimensions and/or position of a scan area on the platen. The laser movement controls can be operated to adjust the dimensions and/or position of the scan area on the platen.

DETAILED DESCRIPTION

Figure 1:
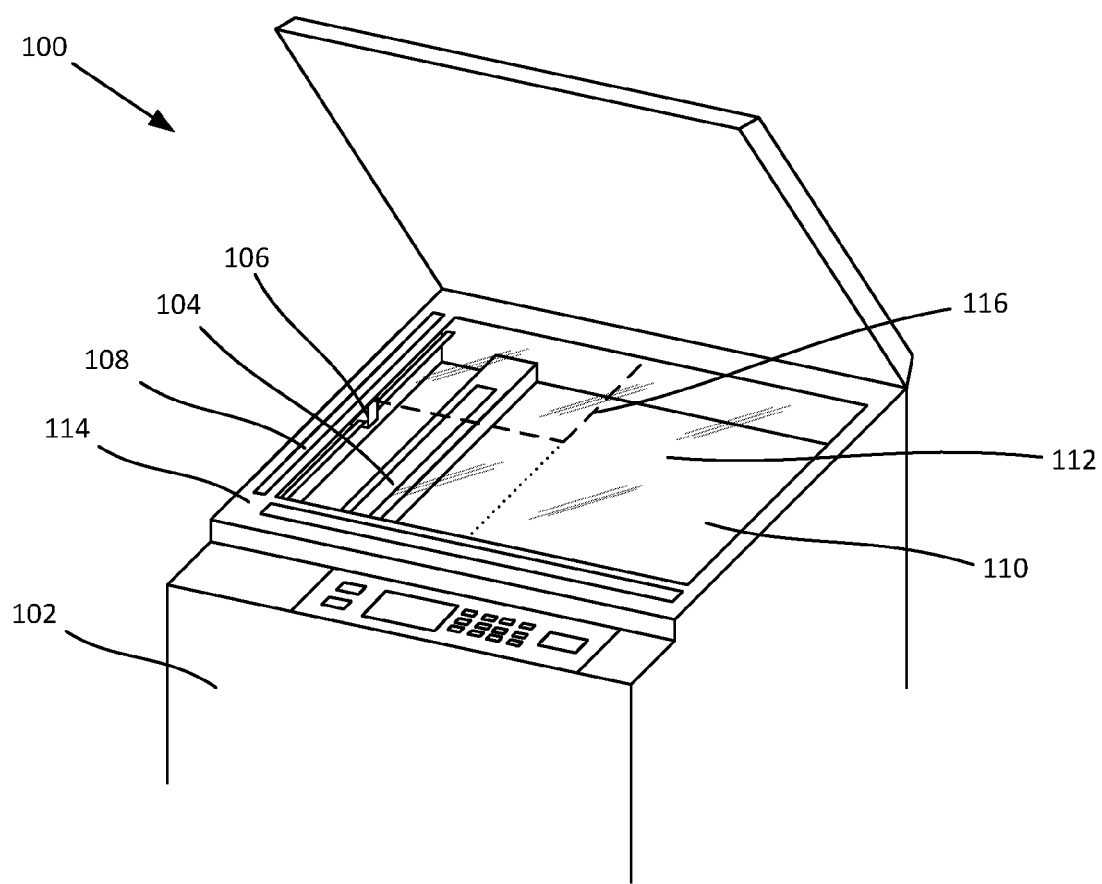
FIG. 1 depicts an embodiment of a scanner.

FIG. 1 depicts an embodiment of a scanner 100. A scanner 100 can comprise a housing 102, one or more image sensors 104, one or more laser assemblies 106, and one or more laser movement controls 108. In some embodiments a scanner 100 can be a standalone device. In other embodiments a scanner 100 can be incorporated with other devices into a multifunctional device. By way of a non-limiting example, a scanner 100 can be a part of a multifunctional printer (MFP) that also has a printer, copier, fax machine, and/or other devices or functionality.

A scanner's housing 102 can be a case or outer body that surrounds the interior of the scanner 100. The housing 102 can define an aperture 110 on an upper planer surface of the housing 102, and the scanner can comprise a platen 112 positioned to span and fill the aperture 110 such that the platen 112 is suspended above the interior of the scanner 100. The platen 112 can be transparent planer member, such as a plane of glass. In some embodiments, the aperture 110 and/or platen 112 can be rectangular, as shown in FIG. 1.

The housing 102 can have, or be coupled with, a bezel 114 that immediately surrounds, supports, and/or covers the edges of the platen 112. By way of a non-limiting example the bezel 114 can be a frame, or portions of the housing 102, that surrounds the peripheral edges of the platen 112.

Figure 2:
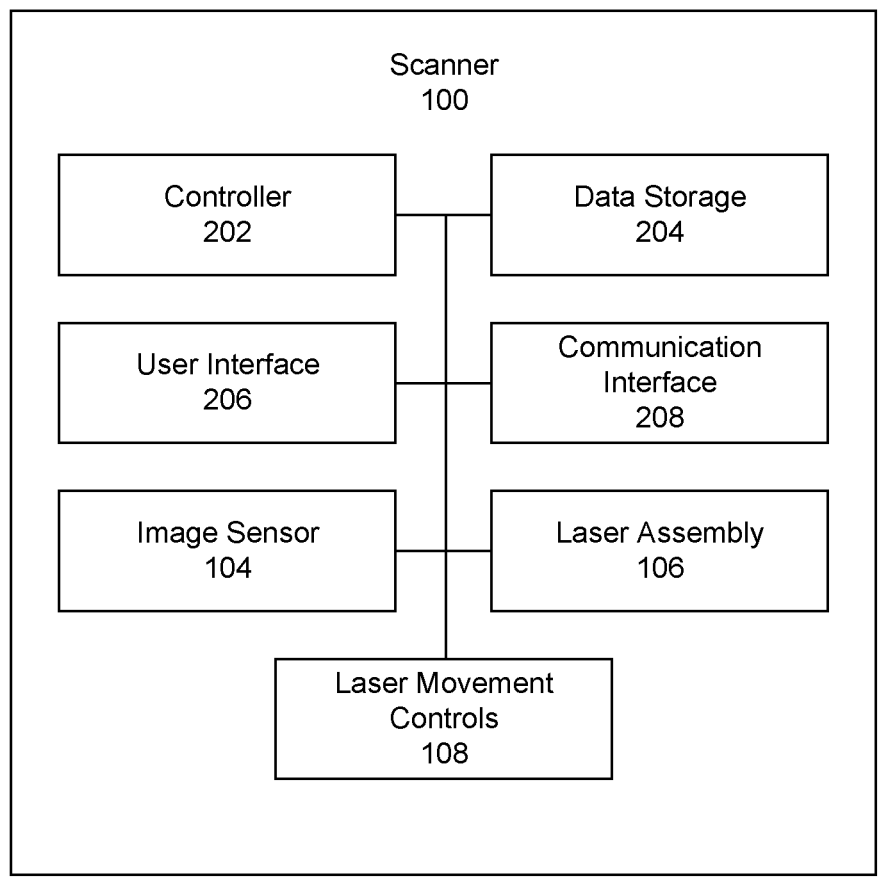
FIG. 2 depicts an embodiment of a scanner's system.

As shown in FIG. 2, a scanner 100 can comprise at least one controller 202, at least one data storage unit 204, and a user interface 206. Each controller 202 can be a chip, circuit and/or processor configured to direct the operations of the scanner 100, such as an application-specific integrated circuit (ASIC), central processing unit (CPU), graphics processing unit (GPU), or any other chip, circuit, or processor. In some embodiments a plurality of chips, circuits, and/or processors can operate together to direct the operations of the scanner 100. A data storage unit 204 can be one or more internal digital storage devices, such as random access memory (RAM), flash memory, a hard disk drive, any/or any other type of digital memory. The user interface 206 can comprise hardware and/or software elements for receiving instructions from users and/or displaying information to users. By way of various non-limiting examples, the user interface 206 can comprise a screen and/or input devices, such as LCD screens, touchscreens, buttons, indicator lights, speakers, graphical user interfaces, and/or any other input or output device. In some embodiments the scanner can further comprise one or more communication interfaces, such as devices configured to communicate with other devices over a computer network, fax connection, USB connection, or any other data or network connection.

Returning to FIG. 1, one or more image sensors 104 can be mounted within the housing 102 below the platen 112. The image sensors 104 can be configured to scan documents placed against the top of the platen 112. By way of a non-limiting example, the image sensors 104 can be coupled with one or more controllers 202 and/or data storage units 204, such that they can scan a document on the platen 112 and save a digital representation of the document in memory on a data storage unit 204. In some embodiments the image sensors 104 can be contact image sensors (CIS). In other embodiments the image sensors 104 can be charge coupled devices (CCD), or any other type of image sensor.

In some embodiments the image sensors 104 and/or separate light sources can be movably coupled with the housing 102, such that the image sensors 104 and/or light sources can move below the platen 112 to scan different areas of the platen 112. In other embodiments, the image sensors 104 can be stationary, and the scanner 100 can comprise an array of moveable mirrors and/or light sources that can move to direct light from above the platen 112 into the image sensors 104.

One or more laser assemblies 106 can also be mounted inside the housing 102 below the plane of the platen 112. By way of a non-limiting example, a laser assembly 106 can be mounted beneath the bezel 114, as shown in the side view of FIG. 3 and the top view of FIG. 4. Each laser assembly 106 can be configured to emit or project a laser line 116 on the platen 112.

Figure 3:
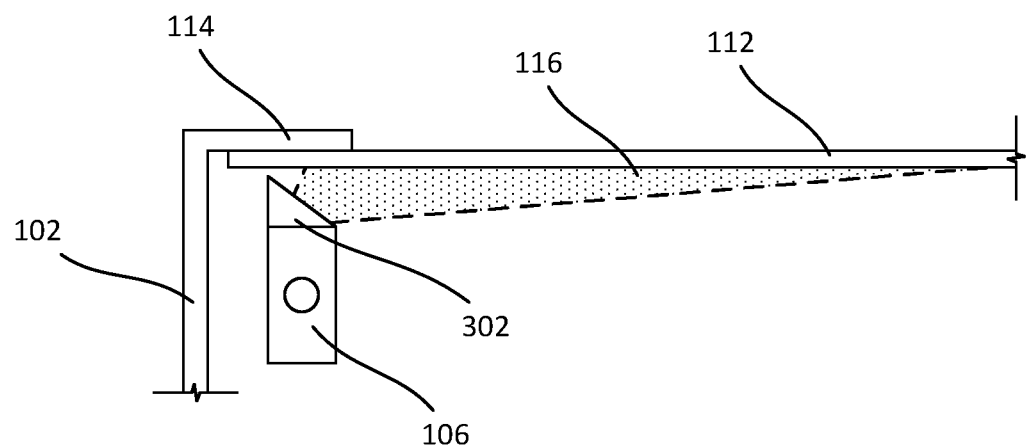
FIG. 3 depicts a side view of an embodiment of a laser assembly.

Each laser assembly 106 can comprise a laser emitter 302, as shown in FIG. 3. The laser emitter 302 can be configured to selectively emit or project a laser line 116 on the platen 112. By way of a non-limiting example, in some embodiments the laser emitter 302 can emit laser light along a portion of a plane that intersects with the plane of the platen 112, such that the laser light appears on the platen 112 as a laser line 116.

Figure 5A:
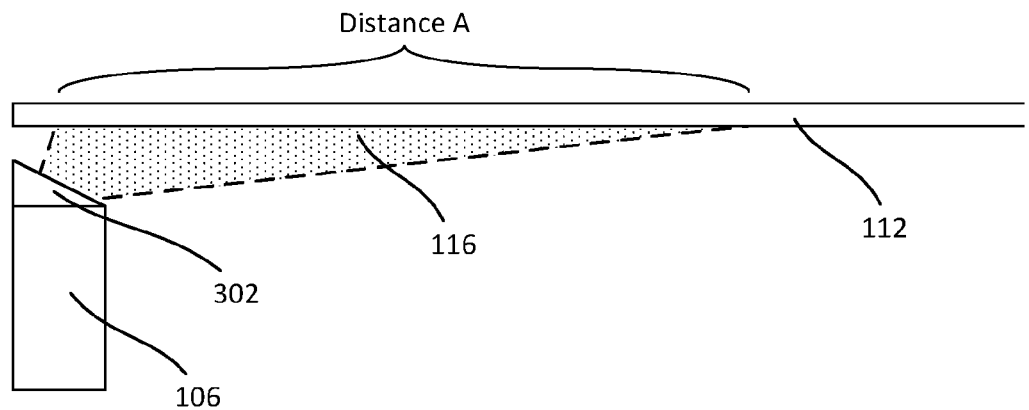
FIGS. 5A-5C depict adjustment of the angle at which a laser line is projected onto a platen to change the line's length and/or position.
Figure 5B:
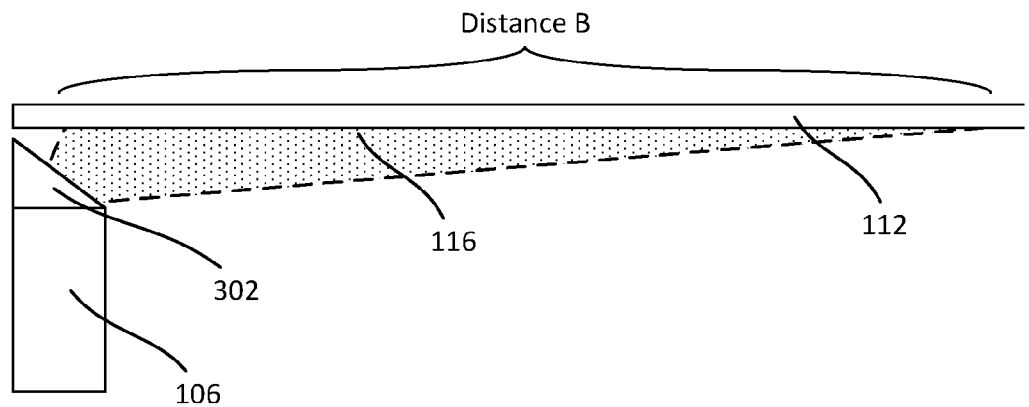
Figure 5C:
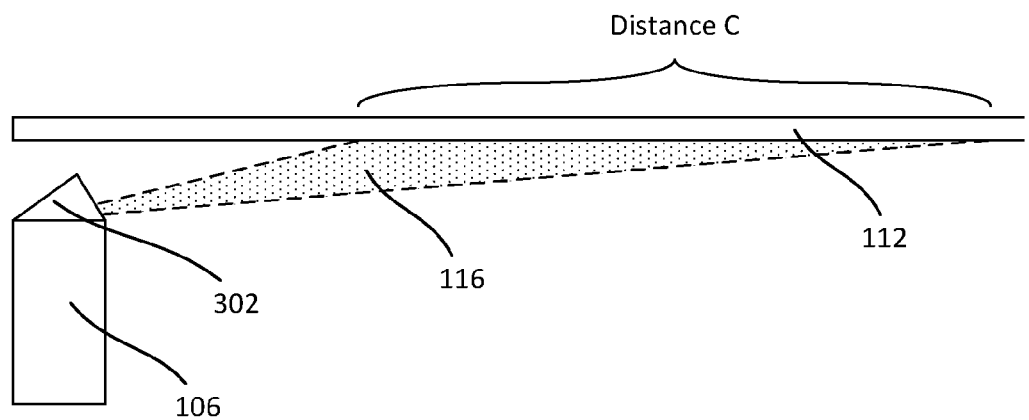

The laser line 116 emitted by the laser emitter 302 can extend linearly across some or all of the platen 112. In some embodiments, changing the angle at which laser light is emitted from the laser assembly 106, and/or changing the width of an opening through which a partial plane of emitted laser light leaves the laser assembly 106, can change the length and/or position of the laser line 116 on the platen 112. By way of a non-limiting example, FIGS. 5A-5C depict an embodiment in which the laser emitter 302 can adjust the angle at which it emits laser light and/or the width of a shutter opening to change the length and/or position of the laser line 116 on the platen 112 from Distance A in FIG. 5A to Distance B in FIG. 5B, or to Distance C in FIG. 5C. As shown in FIGS. 5A-5B, in some situations the laser line 116 can be projected onto the platen 112 such that it extends from a point proximate to an edge of the platen 112 to a point farther away on the platen 112. As shown in FIG. 5C, in other situations the laser line 116 can be projected at an angle such that the laser line 116 begins at a point away from the edge of the platen 112 and extends to another point farther away on the platen 112. As such, in some embodiments when a laser emitter 302 projects a partial laser line 116 that has a length less than the full length of the platen 116, the laser emitter 302 can move the partial laser line 116 closer or farther away from the laser emitter 116 on the platen 112, and/or adjust the length of the partial laser line 116.

In some embodiments, the laser assembly 106 and/or the laser emitter 302 can be rotated or angled to adjust the angle at which the laser light is emitted. In other embodiments, the laser emitter 302 can have one or more shutters that can move to adjust the angle at which the laser light is emitted and/or to adjust the width of an opening through which the laser light leaves the laser emitter 302. In some embodiments, a laser emitter 302 can alternately or additionally selectively adjust its power level to change the strength and/or intensity of the laser line 116 as it appears on the platen 112.

Figure 4:
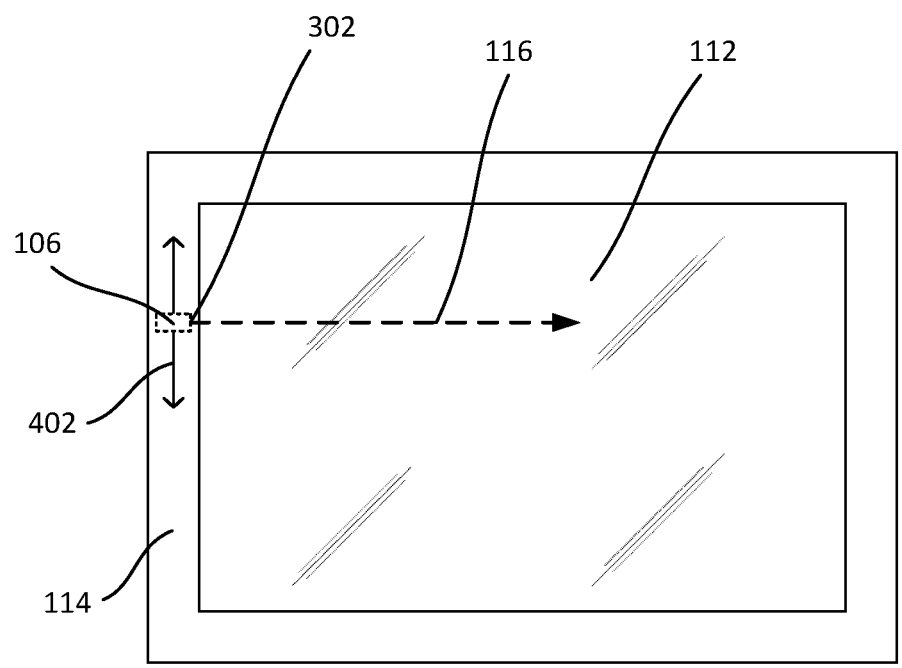
FIG. 4 depicts a top view of a scanner.

Each laser assembly 106 can be linearly moveable along an axis 402 within the housing 102. The laser assembly's laser emitter 302 can be oriented to emit its laser line 116 on the platen 112 in a direction substantially orthogonal to the axis 402 along which the laser assembly 106 moves, as shown in FIG. 4. A laser line 116 can be considered as being substantially orthogonal to an axis 402 when it extends at an angle 90 degrees relative to the axis 402, or at any other angle between 85 and 95 degrees relative to the axis 402. Movement of the laser assembly 106 side to side along its axis 402 can cause also the laser line 116 to move side to side on the platen 112, substantially orthogonally to the direction along which it extends. By way of a non-limiting example, a laser assembly 106 can be configured to move linearly along a y-axis, and can be configured to emit a laser line 116 in a direction parallel to an x-axis.

Figure 6:
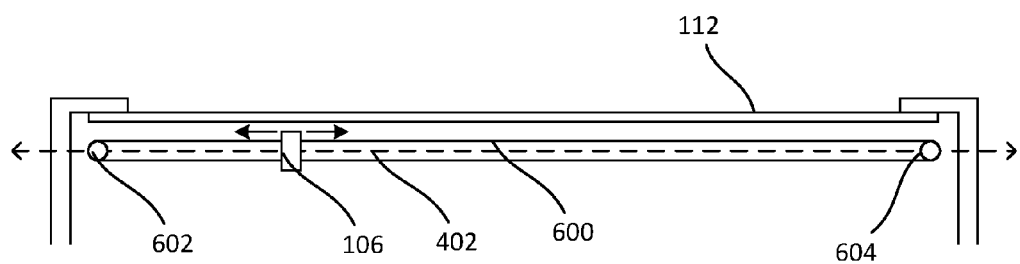
FIG. 6 depicts a side view of a first embodiment of a laser assembly's mount.

In some embodiments, a laser assembly 106 can be mounted on a belt 600 spanning along an axis 402 between a servo 602 and a wheel 604 mounted within the scanner's housing 102, as shown in the side view of FIG. 6. The servo 602 can be motorized, such that motorized movement of the servo 602 causes the belt 600 to move about the wheel 604. Movement of the belt 600 can thus cause movement of the laser assembly 106 along the axis 402 to any desired coordinate on the axis 402.

Figure 7:
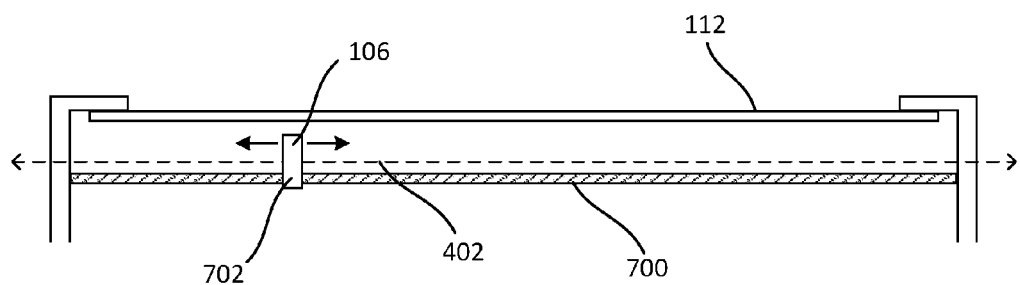
FIG. 7 depicts a side view of a second embodiment of a laser assembly's mount.

In other embodiments, a laser assembly 106 can be coupled with a bar 700 mounted within the scanner's housing 102 such that the bar 700 extends along an axis 402, as shown in the side view of FIG. 7. In these embodiments, the laser assembly 106 can comprise a drive mechanism 702, such motorized wheels and/or gears that can selectively drive the laser assembly 106 along the bar 700 to any desired coordinate on the axis 402. In some embodiments the bar 700 can have threads or teeth, such that gears in the laser assembly 106 can interact with the bar 700 to drive it along the bar 700.

In still other embodiments, a laser assembly 106 can be mounted on a robotic arm, slider, gantry, track, and/or any other device or mechanism such that the laser assembly 106 can selectively move linearly back and forth along an axis 402 within the scanner's housing 102.

In some embodiments a laser assembly 106 can be mounted to move along an axis 402 positioned above one or more image sensors 104 within the housing 102. By way of a non-limiting example, in embodiments in which one or more image sensors 104 are configured to move beneath the platen 112, the laser assemblies 106 can be positioned to move within a plane located between the platen 112 and the plane within which the image sensors 104 move. In alternate embodiments the laser assemblies 106 can be positioned at any other desired height or position relative to the image sensors 104.

Movement of a laser assembly 106 along its axis 402 can be at least partially controlled with a laser movement control 108 that accepts commands from a user to move the laser assembly 106 along the axis 402. In some embodiments the laser movement control 108 can be in communication with a controller 202, which can in turn direct movement of the associated laser assembly 106 along its axis 402 while tracking the current position of the laser assembly 106 on the axis 402. In alternate embodiment the laser movement control 108 can be operated to directly move a laser assembly 106 along its axis 402, and the laser movement control 108 and/or the laser assembly 106 can report the current position of the laser assembly 106 on the axis 402 to a controller 202.

In some embodiments, a laser movement control 108 can be used to toggle movement of an associated laser assembly 106 along its axis 402. By way of a non-limiting example, in some embodiments a user can press a button to begin movement of an associated laser assembly 106 in along an axis 402, and that movement can continue until the laser assembly 106 reaches a termination point on the axis 402 or until the user presses the button a second time.

In other embodiments, activation of a laser movement control 108 can cause continuous movement of an associated laser assembly 106 along its axis 402 until the laser movement control 108 is deactivated. By way of a non-limiting example, in some embodiment a user can press and hold a button to move an associated laser assembly 106 along its axis until the user releases the button.

In still other embodiments, each operation of a laser movement control 108 can cause an associated laser assembly 106 to move along its axis by a predetermined distance. By way of a non-limiting example, in some embodiments a laser assembly 106 can move along its axis 402 by quarter of an inch each time a button is pressed. In some of these embodiments, a single operation of a laser movement control 108 can move the laser assembly 106 by a predetermined distance, while operating the laser movement control 108 more than once within a predetermined time period can cause continuous movement of the laser assembly 106. By way of a non-limiting example, in some embodiments a single press of a button can move a laser assembly 106 along the axis 402 by a predetermined distance, while a double press of the same button can begin continuous movement of the laser assembly 106 along the axis 402 until the button is pressed again.

In yet other embodiments, operation of a laser movement control 108 can move an associated laser assembly 106 to a specified point on its axis 402, adjust the laser assembly's speed, and/or control movement of the laser assembly 106 in any other desired manner.

In some embodiments a laser movement control 108 can be a button, dial, switch, lever, slider, joystick, touchpad, touchscreen, or any other input device separate from the scanner's other user interfaces 206. Such laser movement controls 108 can be mounted on the bezel 114 or elsewhere on the housing 102 such that they are accessible to users. In alternate embodiments a laser movement control 108 can be a part of a user interface 206 that also controls other aspects of the scanner 100. By way of a non-limiting example, the user interface 206 can be a touchscreen that can selectively display one or more virtual buttons or sliders that operate as laser movement controls 108 for a laser assembly 106.

In some embodiments a single laser movement control 108 can selectively control movement of one or more laser assemblies 106 in one or more directions. In other embodiments, distinct laser movement controls 108 can control the movement of specific laser assemblies 106, or control the movement of specific laser assemblies 106 in specific directions or to specific locations. By way of a non-limiting example, dedicated left and right buttons can control movement of a single laser assembly. By way of another non-limiting example, an array of buttons can be spaced along an edge of the bezel 114 above an axis 402, such that pressing a single button within the array causes movement of an associated laser assembly 106 to a position on the axis 402 corresponding to the pressed button.

Figure 8:
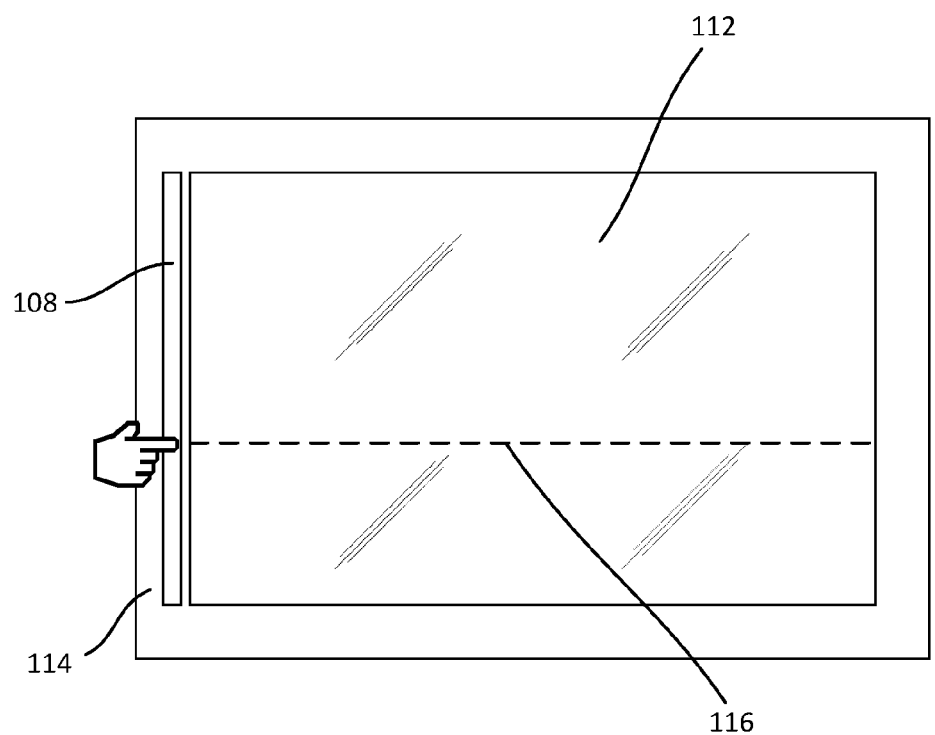
FIG. 8 depicts an embodiment in which a laser movement control is a touch-sensitive strip mounted on a bezel.

FIG. 8 depicts a non-limiting exemplary embodiment in which a laser movement control 108 is a touch-sensitive strip mounted on the bezel 114. The touch-sensitive strip can be oriented above and/or parallel to the axis 402 along which a laser assembly 106 can move, such that positions on the touch-sensitive strip correspond to positions on the axis 402. In some embodiments, when a user touches the touch-sensitive strip associated with a laser assembly 106 at a particular position, the laser assembly 106 can move directly to the corresponding position on its axis 402. In alternate embodiments, when a user touches the touch-sensitive strip at a position on the axis 402 that is away from the laser assembly's current position on the axis 402, the laser assembly can move along the axis 402 toward the position of the user's touch, moving either in a predetermined distance increment for each touch, or moving continuously until the user releases his or her finger from the touch-sensitive strip or the position of the touch is reached.

Figure 9:
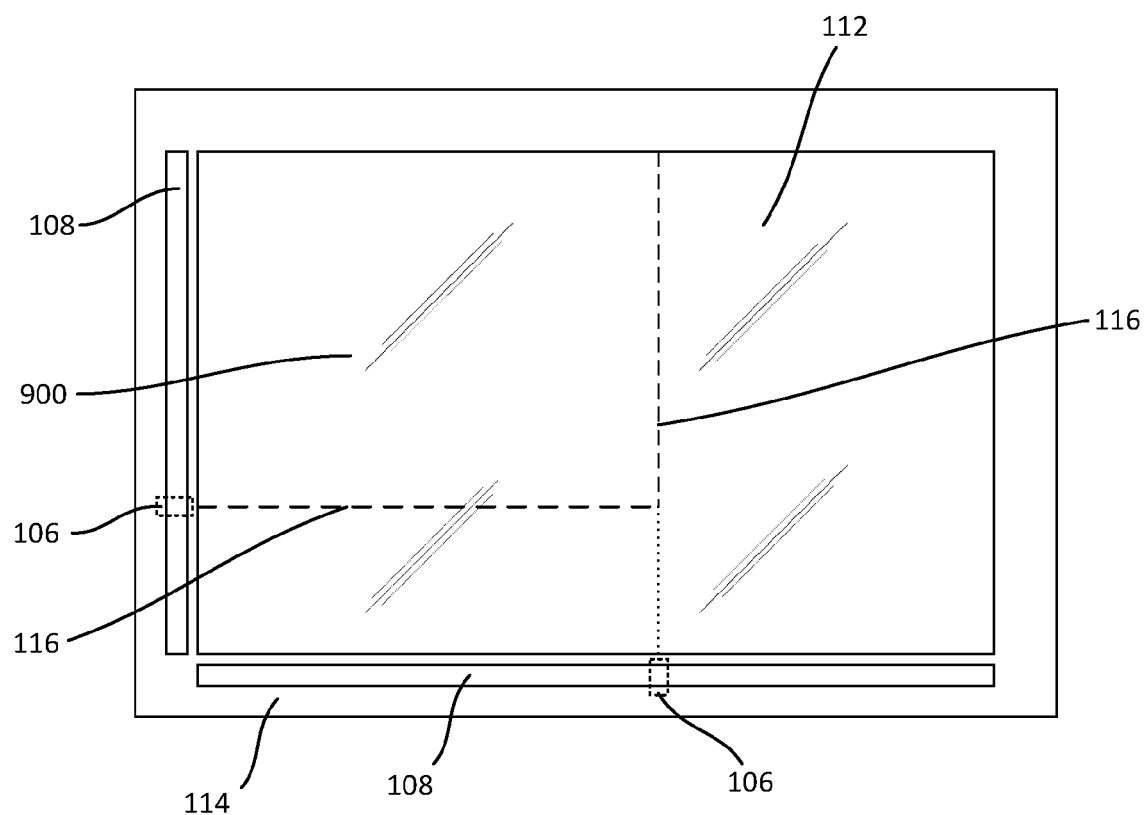
FIG. 9 depicts edges of a scan area being illustrated with substantially orthogonal laser lines projected onto a platen.

One or more of the scanner's controllers 202 can use the positions of one or more laser assemblies 106 on their axes to define the dimensions and/or position of a two-dimensional scan area 900 on the platen 112, as shown in FIG. 9. The scan area 900 can be an area of the platen 112 that will be scanned by one or more image sensors 104 to create a digital representation of documents, photographs, or anything else placed above the platen 112 within that area. In some embodiments the image sensors 104 can scan only within the designated scan area 900. In alternate embodiments the image sensors 104 can scan the full platen 112, and the scanner 100 can then crop the resulting digital representation down to a section corresponding to the position and dimensions of the designated scan area 900.

FIG. 9 depicts an exemplary embodiment having two laser assemblies 106 positioned on substantially orthogonal axes 402 that are configured to emit substantially orthogonal laser lines 116. One laser assembly 106 can be oriented to move along an x-axis parallel to a first edge of the platen 112. The other laser assembly 106 can be oriented to move along a y-axis parallel to a second edge of the platen 112 that is substantially orthogonal to the first edge. In this exemplary embodiment, each laser assembly 106 can be independently controlled by a separate touch-sensitive strip extending along the edge of the bezel 114, above and/or parallel to the axis 402 along which the laser assembly 106 moves. The laser lines 116 and/or the axes 402 can be considered as being substantially orthogonal to one another when they are oriented at a 90 degree angle relative to one another, or are oriented at any other angle between 85 and 95 degrees relative to one another.

In embodiments with two laser assemblies 106 mounted to move along substantially orthogonal axes 402, a controller 202 can determine the dimensions and position of a scan area 900 based on the coordinates of the laser assemblies 106 on each axis 402 relative to a zero coordinate. In some embodiments the zero coordinate on each axis 402 can be a position at which the platen 112 meets the bezel 114, such that the current scan area 900 can be bounded by the visible edges of the platen 112 and the positions of the two laser assemblies 106 on their axes 402. By way of a non-limiting example, zero coordinates in two dimensions can be located at a corner of the platen 112, such that the dimensions of the scan area 900 can be determined by the distance of the laser assemblies 106 away from that corner in each dimension.

Similarly, as the laser assemblies 106 can each emit a laser line 116 on the platen 112, the resulting substantially orthogonal laser lines 116 can visually indicate the dimensions and position of the scan area 900 on the platen 112. Two sides of the scan area 900 can be shown by the laser lines 116, and the other two sides of the scan area 900 can be the visible edges of the platen 112. In some embodiments the laser assemblies 106 can change the length and/or position of their laser line 116 on the platen 112 to extend from an edge of the platen 112 to the current position of the other laser assembly 106 on its axis 402. As such, the laser lines 116 can be projected with a length and/or position such that they begin or end where they intersect on the platen, as shown in FIG. 9. In alternate embodiments, the laser lines 116 can extend across any other portion of the platen 112.

Figure 10A:
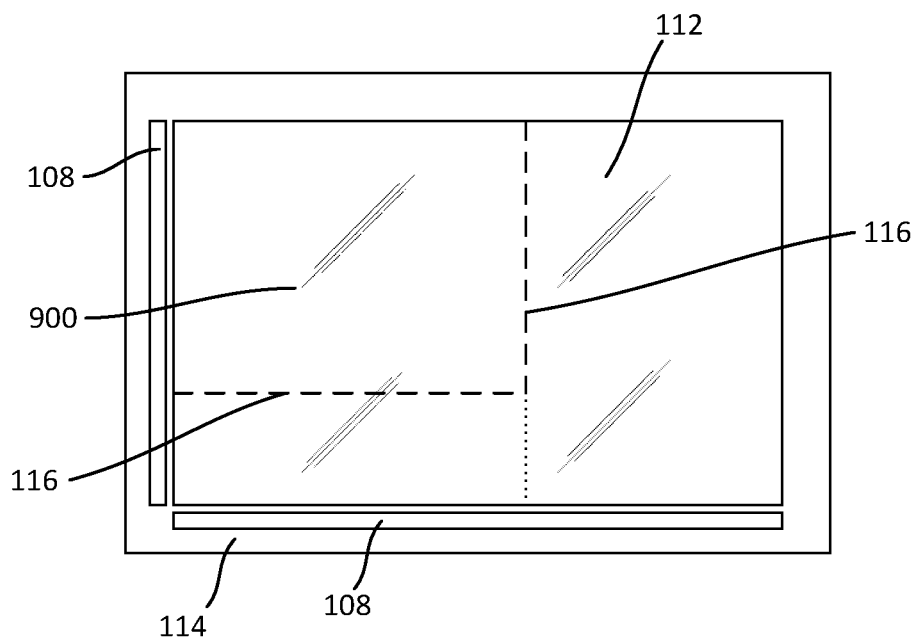
FIGS. 10A-10B depict adjustment of the dimensions of a scan area through movement of laser lines.
Figure 10B:
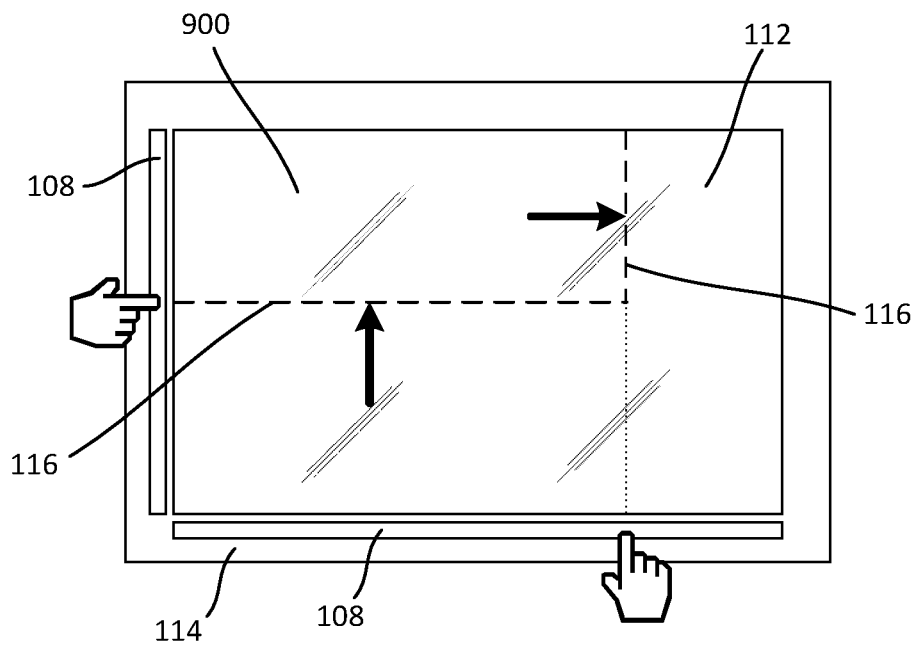

In use, a user can use the laser movement controls 108 to move the laser assemblies 106 such that the laser lines 116 show the boundaries of the user's desired scan area 900. Because a user can visually see the borders of the current scan area 900 as designated by the laser lines 116, the user can use the laser movement controls 108 to visually adjust the scan area's dimensions in one or more directions. By way of a non-limiting example, a user can use laser movement controls 108 to move the laser lines 116 and change the scan area 900 from having the dimensions shown in FIG. 10A to the dimensions shown in FIG. 10B. As such, if the user desires, the user can move the laser lines 116 to entirely surround an item he or she wants to scan in order to set the scanner 100 to fully scan the item, even if the item has a non-rectangular or irregular shape.

In some embodiments, the laser lines 116 can be strong enough to be visible through paper placed on the platen 112. By way of a non-limiting example, a user can know from a laser line 116 that is visible through the back of a piece of paper how much of that paper would be cut off from a scan if the scan were performed using the current scan area 900. As such, cropping a document by scanning only a portion of the document can be visually confirmed by a user before the scan takes place, or the user can use the laser movement controls 108 to adjust the dimensions of the scan area 900.

In some embodiments the laser assemblies 106 can be mounted in positions such that their laser lines 116 are emitted away from a user's likely position. By way of a non-limiting example, one laser assembly 106 can be mounted under a front edge of the bezel 114 closest to a control panel on the front of the housing 102, such that its laser line 116 is emitted toward a back edge of the bezel 114, and another laser assembly 106 can be mounted under a left edge of the bezel 114 such that its laser line 116 is emitted toward the right edge of the bezel 114. Because a user is likely to stand in front of the housing 102 to operate the control panel, the laser lines 116 can be directed away from the user's likely position while still being visible to the user on the platen 112. In some embodiments, laser assemblies 106 can be mounted under the bezel 114 far enough away from the edge of the bezel 114 such that the bezel 114 can shield the laser lines 116 from directly shining into users' eyes even when users are in other locations.

Figure 11:
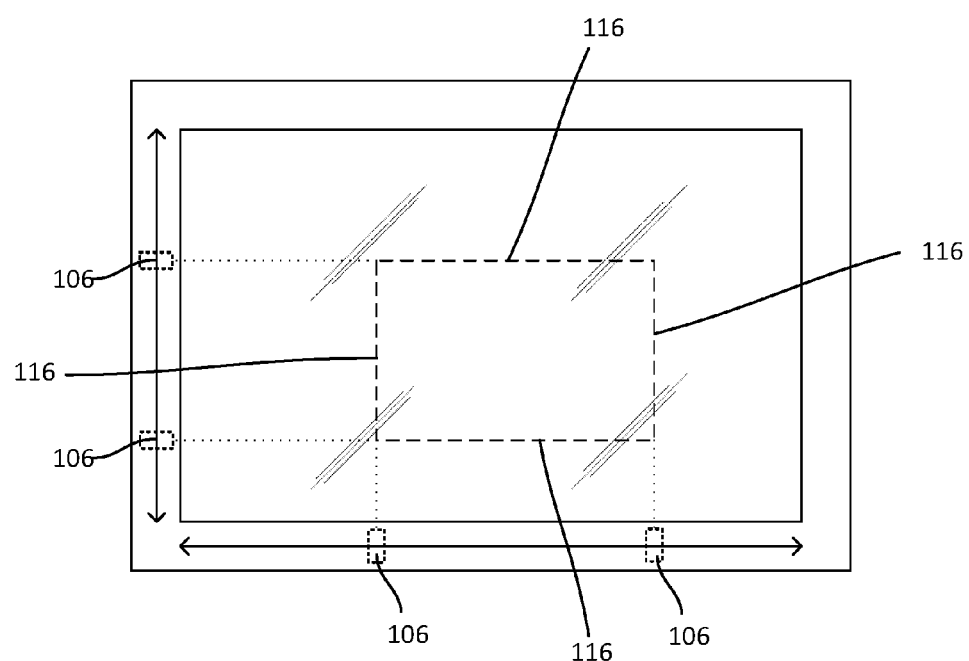
FIG. 11 depicts an embodiment with two laser assemblies mounted on an x-axis, and two more laser assemblies mounted on a y-axis.

In some embodiments, a scanner 100 can comprise more than one laser assembly 106 on one or more axes 402, such that the scan area 900 can be determined from the distance between laser assemblies 106 that share an axis 402. By way of a non-limiting example, FIG. 11 depicts an embodiment with two laser assemblies 106 mounted on an x-axis, and two more laser assemblies 106 mounted on a y-axis. In FIG. 11, the scan area 900 the area between the two laser assemblies 106 on the x-axis, and also between the two laser assemblies 106 on the y-axis, such that the scan area 900 can be located on the interior of the platen 112 away from the edges of the platen 112. In these embodiments, each laser assembly 106 can be moved independently through laser movement controls 108, such that any of the four edges of the scan area 900 can be individually adjusted to change the dimensions of the scan area 900, and/or the position of the scan area 900 can be moved on the platen 112.

Figure 12:
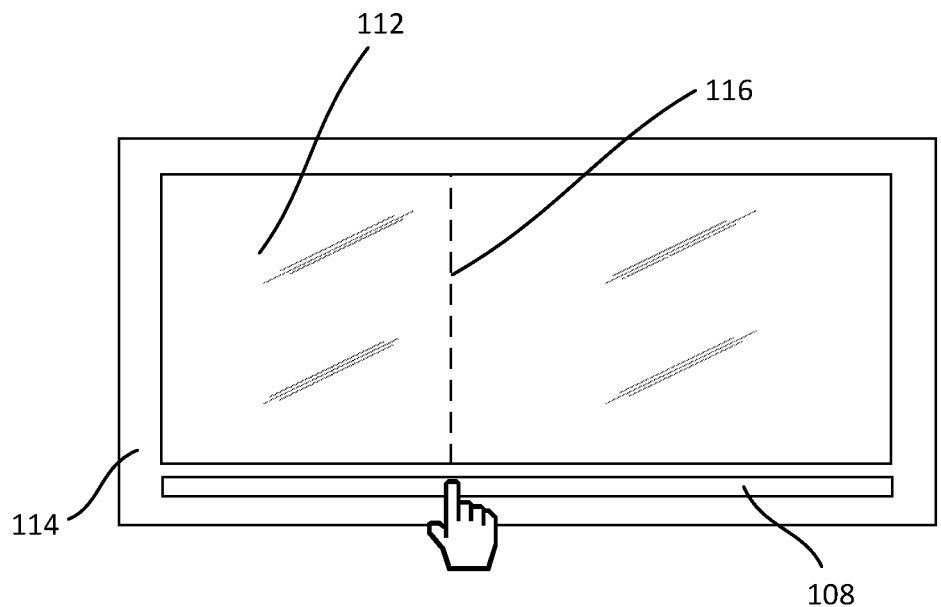
FIG. 12 depicts an embodiment with a single laser assembly.

In other embodiments, the scan area can have one or more laser assemblies 106 movable along only one axis 402, such the dimensions of the scan area 900 are fixed in one direction but can be adjustable in the other direction. By way of a non-limiting example, FIG. 12 depicts an embodiment in which the height of the scan area 900 can be fixed at the height of the platen 112, while the width of the scan area 900 can be adjusted by moving a single laser assembly 106 along an x-axis.

Figure 13:
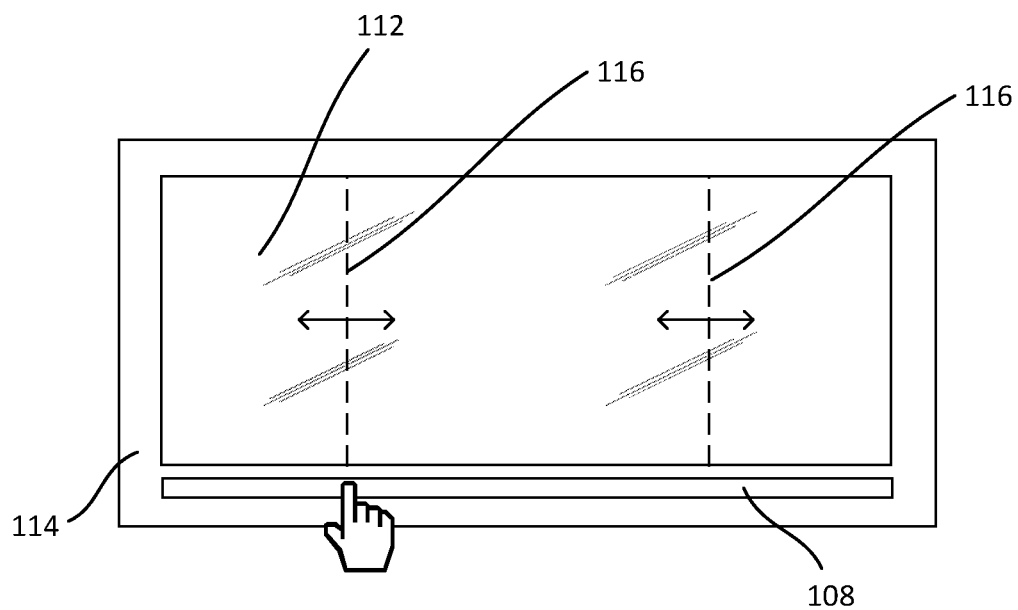
FIG. 13 depicts an embodiment with two laser assemblies movable along a single axis.

FIG. 13 depicts an embodiment having two laser assemblies 106 movable along a single axis 402. In some embodiments, the laser assemblies 106 on the same axis 402 can each be moved relative to a center position on the axis 402. By way of a non-limiting example, in FIG. 13, movement of one laser line 116 can be controlled by operating a laser movement control 108, and the other laser line 116 on the same axis 402 can be moved by an identical amount in the opposite direction such that the laser lines 116 each move apart or closer together toward the center position on the axis 402. As such, a user can adjust the dimensions of the scan area 900 on opposing edges at the same time through a single input.

As described above, the scan area 900 can be visually adjusted through movement of the laser assemblies 106 and the laser lines 116 they emit on the platen 112. In some embodiments and/or situations, after the scan area 900 has been selected, the image sensors 104 can be activated to scan documents placed face down within that scan area 900 on the platen 112. In some embodiments, the dimensions of the current scan area 900 can be further displayed on a display screen. By way of a non-limiting example, a user can visually adjust the size and/or position of the scan area 900 by moving the laser lines 116 on the platen 112, and the specific dimensions of the adjusted scan area 900 in units such as inches, centimeters, or any other unit can be displayed on a screen on the housing 102.

In alternate embodiments and/or situations, the dimensions of a scan area 900 can be visually selected and/or adjusted on the platen 112 as described above, and the controller 202 can save those dimensions to scan documents using a different scanning method. By way of a non-limiting example, a user who desires to scan a stack of documents each having the same dimensions can place one test page on the platen 112, use the laser movement controls 108 to select appropriate dimensions of a scan area 900 suitable for the size and shape of that test page, and save the dimensions of that scan area 900 to the scanner's memory. The user can then remove the test page and place the entire stack of documents into an automatic document feeder within the scanner 100. The scanner 100 can then scan each page in the stack by sliding each page from the automatic document feeder past an image sensor 104, and the controller 202 and/or image sensor 104 can use the dimensions of the scan area 900 selected by the user to determine the dimensions to scan for each page passing by the image sensor 104.

In some embodiments, a scanner 100 can use laser lines 116 to display an initial or default scan area 900, which a user can then adjust using the laser movement controls 108. By way of non-limiting examples, in various embodiments users can select from one or more preset or common scan sizes displayed on a menu on a display screen, users can input initial dimensions for a scan area 900 through a keypad or other input device, or the scanner 100 can display a default scan area 900 with a predetermined size. Once the initial scan area 900 is shown on the platen 112 with laser lines 116, users can either confirm that scan area 900 to begin scanning, or use one or more laser movement controls 108 to adjust the dimensions and/or position of the scan area 900 before beginning a scan.

In some embodiments the scanner 100 can access information about each user, such as saving or accessing user histories and/or profiles stored locally, on a networked device, or on a cloud server. By way of a non-limiting example, the scanner 100 can request that a user visually confirm the dimensions and/or position of a scan area 900 on the platen 112 when the user selects a scan size they have never selected before, or has selected less frequently than a predetermined threshold frequency. By way of another non-limiting example, the scanner 100 can save scan areas 900 previously selected or used by a particular user, such that the user can quickly load favorite or previously selected scan areas 900 without having to recreate them from a default scan area 900.

As described above, in some embodiments a user can use the laser lines 116 to adjust and/or select a scan area 900 such that the image sensors 104 can scan the platen 112 within that scan area 900 and generate a digital file. In some embodiments the digital file can be stored in memory, such as within the scanner's data storage 204. In other embodiments the digital file can be transmitted to another computer or device over a network or data connection, or be digitally sent to an email address or other destination when the scan completes. In still other embodiments in which the scanner 100 is incorporated into an MFP also having a copier, the scan area 900 can be used to define a portion of the platen 112 that will be copied onto hard copies using the MFP's copier.

In some embodiments, the laser assemblies 106 can selectively activate their laser emitters 302, such that the laser lines 116 can be turned on or off. In some embodiments, the scanner 100 can have hardware or software controls operable by a user to turn the laser lines 116 on and off. By way of a non-limiting example, a button can be mounted on the bezel 114 or elsewhere on the housing 102 that activates the laser lines 116 when pressed and held, or that toggles activation or deactivation of the laser lines 116 on each press.

In other embodiments, the laser emitters 302 can be linked with a lid that selectively covers the platen 112, such that the laser emitters 302 can emit laser lines 116 when the lid is opened and the platen 112 is uncovered, but turns off the laser lines 116 when the lid is closed and the platen 112 is covered. By way of a non-limiting example, the lid can have a protrusion that presses against a "laser off" button mounted on the bezel 114 when the lid is closed, but that moves away from and releases the "laser off" button when the lid is raised, thereby turning the laser lines 116 on when the lid is opened. By way of other non-limiting examples, sensors linked with gears or hinges that connect the lid to the housing 102 can signal to a controller 202 whether the lid is open or closed and thus whether the laser lines 116 should be shown, or a light sensor positioned under the lid can send signals to activate emission of the laser lines 116 when the lid is opened and light hits the light sensor.

Figure 14:
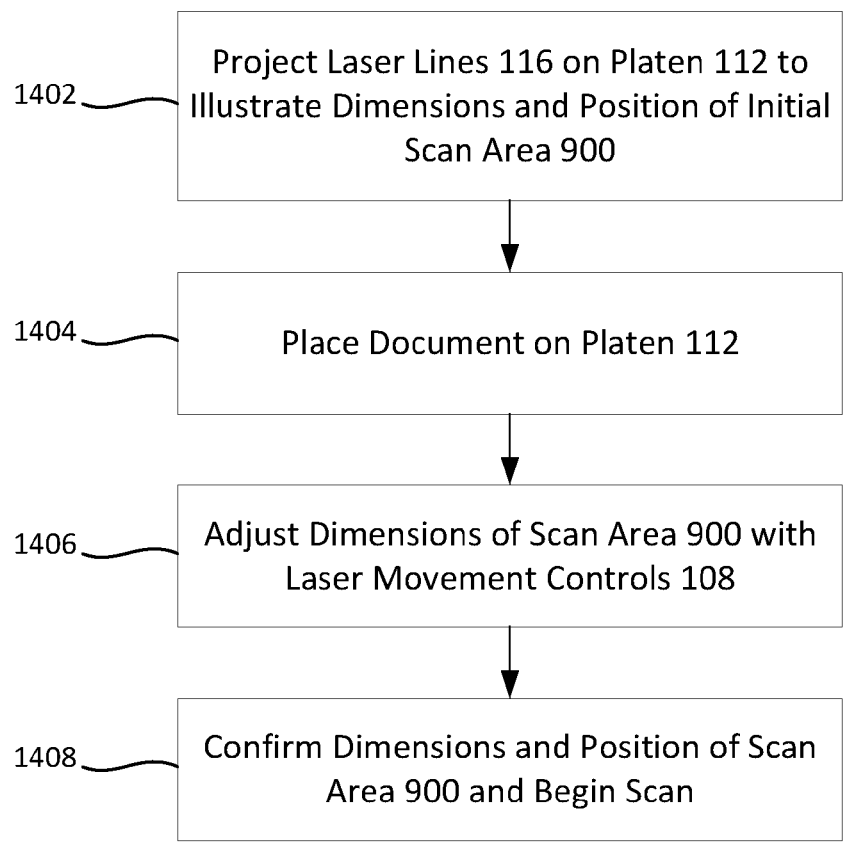
FIG. 14 depicts a flow chart of an exemplary method of using a scanner to select a scan area.

FIG. 14 depicts an exemplary method of using a scanner 100 to select a scan area 900. At step 1402, the scanner 100 can project laser lines 116 on the platen 112 that illustrate edges of an initial scan area 900. In some embodiments, the laser lines 116 can be projected automatically, or upon a command input by a user. In some embodiments the initial scan area 900 can be a scan area 900 with preset default dimensions. In other embodiments the initial scan area 900 can be a scan area 900 with dimensions selected by a user.

At step 1404, a user can place a document on the platen 112. In alternate embodiments, the user can place the document on the platen 112 prior to displaying the laser lines 116 during step 1402.

At step 1406, the user can use one or more laser movement controls 108 to move the laser lines 116 and thereby adjust the size of the current scan area from its initial dimensions. By way of a non-limiting example, the user can move the laser lines 116 such that the scan area 900 entirely surrounds the document on the platen 112, or surrounds the portion of the document that the user wants to scan. When the user moves the laser lines 116, the scanner can change the dimensions and/or position of the scan area 900 in its memory, based on the positions of the laser assemblies 106 on their axes 402.

At step 1408, the user can confirm the scan area 900, and the scanner's image sensors 104 can scan the scan area 900 with its image sensors 104. In some embodiments, the user can input a command to confirm the scan area 900 displayed on the platen 112 via the laser lines 116, and then input a second command instructing the scanner 100 to begin scanning. In other embodiments, the user can input a command to begin scanning, at which point the scanner 100 can begin scanning the current scan area 900.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

What is claimed is:
1. A scanner, comprising:
a rectangular platen;
a first laser assembly mounted below said platen, said first laser assembly being movable along a first axis parallel to a first edge of said rectangular platen, and said first laser assembly being configured to emit a first laser line onto said platen that is substantially orthogonal to said first axis from a position on said first axis;
a second laser assembly mounted below said platen, said second laser assembly being movable along a second axis parallel to a second edge of said rectangular platen, said second axis being substantially orthogonal to said first axis, and said second laser assembly being configured to emit a second laser line onto said platen that is substantially orthogonal to said second axis from a position on said second axis;
a first laser movement controller configured to move said first laser line on said platen in response to a first user input, wherein said first laser movement controller controls movement of said first laser assembly along said first axis;
a second laser movement controller configured to move said second laser line on said platen in response to a second user input, wherein said second laser movement controller controls movement of said second laser assembly along said second axis; and
a controller configured to determine the dimensions of a scan area on said platen from the position of said first laser assembly on said first axis and the position of said second laser assembly on said second axis,
wherein said first laser line and said second laser line illuminate substantially orthogonal boundaries of said scan area on said platen;
wherein said first laser assembly is configured to adjust the angle at which it emits said first laser line to change a length of said first laser line as it appears on said platen, and said second laser assembly is configured to adjust the angle at which it emits said second laser line to change a length of said second laser line as it appears on said platen.

2. The scanner of claim 1, further comprising an image sensor mounted below said platen, wherein said image sensor is configured to scan within the scan area determined by said controller and generate a digital file.

3. The scanner of claim 2, wherein said image sensor is configured to only scan an area of the platen corresponding to said determined scan area.

4. The scanner of claim 2, wherein said image sensor is configured to scan the entire platen into a digital file, and then output a portion of the digital file corresponding to the scan area.

5. The scanner of claim 1, wherein said first laser movement controller and said second laser movement controller each comprise virtual buttons displayed on a touch sensitive display.

6. The scanner of claim 1, wherein said first laser movement controller and said second laser movement controller each comprise hardware buttons mounted on a control panel.

7. The scanner of claim 1, further comprising a laser power control configured to turn off emission of said first laser line and said second laser line when activated.

8. The scanner of claim 7, wherein said laser power control is activated upon closing a lid by moving said lid to cover said rectangular platen.

9. The scanner of claim 1, further comprising a display screen coupled with said controller, wherein said display screen is configured to display the dimensions of said scan area as determined by said controller.

10. The scanner of claim 1, wherein said first laser assembly is mounted on a belt extending along said first axis between a servo and a wheel, wherein movement of said servo drives said belt and moves said first laser assembly along said first axis.

11. The scanner of claim 1, wherein said first laser assembly is mounted on a rod extending along said first axis, and said first laser assembly comprises a motor and gears configured to move said first laser assembly along said rod.

\* \* \* \* \*